Jan. 15, 1929.
W. G. MILLIGAN
1,698,959
HOOD CLAMP AND THE LIKE
Filed Aug. 25, 1926
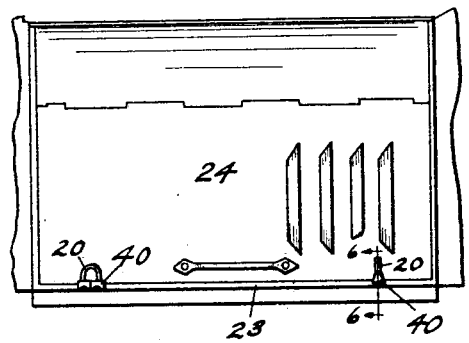
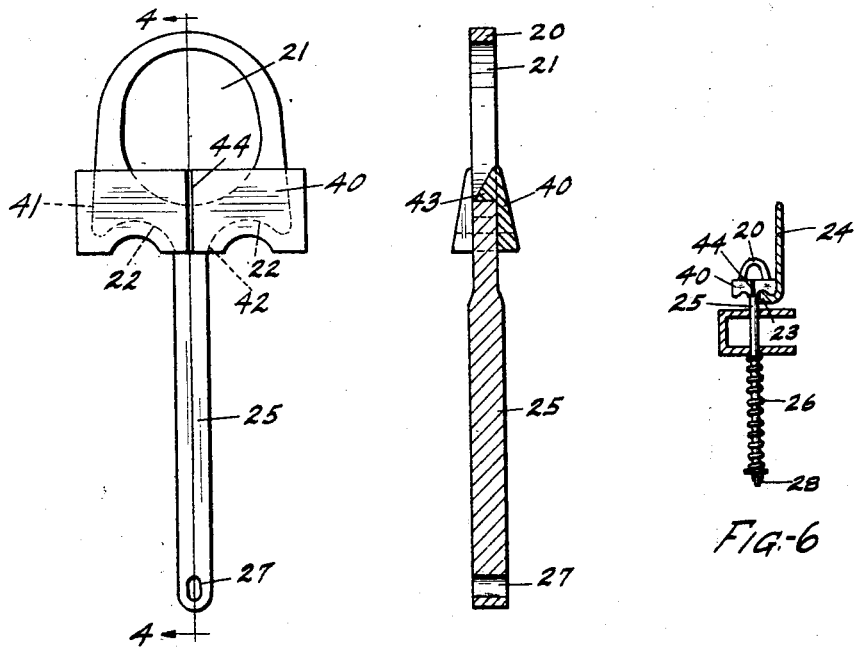
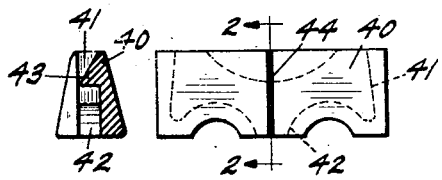
INVENTOR.
WILLIAMS G. MILLIGAN
BY
ATTORNEY.

Patented Jan. 15, 1929.

1,698,959

UNITED STATES PATENT OFFICE.

WILLIAMS G. MILLIGAN, OF AKRON, OHIO.

HOOD CLAMP AND THE LIKE.

Application filed August 25, 1926. Serial No. 131,391.

This invention relates to hood clamps for automobiles or the like.

The purpose of the invention, in general, is to provide a clamp, the clamping surface of which, that is, the surface engaged with the hood, is non-metallic so that vibrations will be absorbed thereby and noise, such as rattling or squeaking resulting from movement of metal on metal will be obviated.

Particularly the present application is directed to a soft resilient pad adapted to be readily attached to clamps already in use, whereby the benefits of the invention can be secured to the vast number of present motor vehicle owners.

The objects of the invention are obtained by the construction illustrated in the accompanying drawings and described below. It is to be understood that the invention is not limited to the specific form thereof shown and described.

Of the accompanying drawings:

Figure 1 is a side elevation of an article adapted to be attached to a present form of clamp so that it may derive the benefits of the invention;

Figure 2 is a section on line 2—2 of Figure 1;

Figure 3 is a side elevation of a clamp having the article of Figures 1 and 2 mounted thereon;

Figure 4 is a section on line 4—4 of Figure 3;

Figure 5 is a view of an automobile illustrating the positions of the clamps in use, one of the clamps of the invention being shown in clamping position and the other in non-clamping position; and Figure 6 is an enlarged detail section on line 6—6 of Figure 4.

Referring to the drawings, 20 designates a metallic clamp of ordinary construction formed with an eye 21 for receiving the fingers, hook-like portions 22—22 which heretofore have engaged the metal beads 23 on the lower edges of the hood 24 (Figures 5 and 6), and formed with a shank 25 about which a compression spring 26 is adapted to be placed, the shank 25 having an aperture 27 therein for receiving a spring securing pin or the like 28.

For use on present equipment, there is shown in Figures 1 and 2, a molded pad 40 of non-metallic material, such as vulcanized rubber, so shaped as to fit on the present metallic clamp and to be mountable thereon without removing the clamp from the automobile. The pad 40 is formed with a socket 41 in its upper surface shaped to the outline of the lower portion of the eye and the clamp portions of the clamp 20. An aperture 42 is provided therein to receive the shank 25 of the clamp 20. A lug 43 of the material of the pad is arranged on one wall of socket 42 (Figure 2) so as to extend through eye 21 nearly into engagement with the other wall thereof. The latter wall is provided with a vertical slit 44 to permit slipping of the pad over shank 25 after the clamp is already mounted in the machine for use. The pad 40 is shown applied to a clamp 20 in Figures 3 to 6, inclusive.

As will be apparent from the foregoing, there will be no metal contact of the clamp with the hood. Tension will be maintained on the shank 25 to yieldingly urge the rubber or other non-metallic hood-engaging clamp surface against the bead of the hood. Accordingly, noises, such as rattling and squeaking of the hood and clamps, are entirely avoided.

Modifications of the invention may be resorted to without departing from the spirit thereof or the scope of the appended claims.

What is claimed is:

1. A flexible, non-metallic pad adapted to be attached to an automobile hood clamp formed with a hook, an eye and a shank, said pad being formed with a socket for receiving the hook, an aperture through which the shank may extend, a lug on one wall of the socket for projecting into the eye to retain the pad on the clamp, and a slit in the other wall of the socket whereby the pad may be slipped into place on the hook over the shank.

2. A flexible, non-metallic pad adapted to be attached to a clamp for motor vehicle hoods, said pad being formed with a socket into which the clamping surface of the clamp extends, a shank receiving aperture extending through the pad from the socket, a slit in the pad extending into the aperture whereby the pad may be flexed so as to slip it over a shank, and means integral with the pad adapted to interlock with a portion of the hood clamp to retain the pad thereon.

3. A pad adapted to be attached to a hook-type hood clamp for automobiles, said pad being formed of vulcanized rubber with a hook receiving socket so as to be capable of being slipped onto the clamp over the hook and secured thereon without removal of the clamp from the automobile.

WILLIAMS G. MILLIGAN.